United States Patent
Yananton

(10) Patent No.: US 8,276,542 B1
(45) Date of Patent: Oct. 2, 2012

(54) METHOD AND STRUCTURE FOR ENTRAPPING SOILS CARRIED BY PET'S PAWS, USING A BONDED, POROUS, WEB FORMING, HIGHLOFT NONWOVEN PAD OR RUNNER

(76) Inventor: Patrick Yananton, Toms River, NJ (US)

( * ) Notice: Subject to any disclaimer, the term of this patent is extended or adjusted under 35 U.S.C. 154(b) by 426 days.

(21) Appl. No.: 12/143,542

(22) Filed: Jun. 20, 2008

(51) Int. Cl.
*A01K 29/00* (2006.01)
(52) U.S. Cl. ...................................................... 119/169
(58) Field of Classification Search .................. 119/169, 119/165, 171, 167, 166, 170; 442/381, 382, 442/389, 391, 392; 604/365, 367, 358; 428/85, 428/90, 91, 92, 95, 96, 48, 47
See application file for complete search history.

(56) References Cited

U.S. PATENT DOCUMENTS

| | | | |
|---|---|---|---|
| 3,476,636 A * | 11/1969 | Crosby | 428/92 |
| 3,658,578 A | 4/1972 | Bennett | |
| 3,717,897 A | 2/1973 | Amos et al. | |
| 3,752,121 A | 8/1973 | Brazzell | |
| 4,293,604 A * | 10/1981 | Campbell | 428/90 |
| 4,609,580 A * | 9/1986 | Rockett et al. | 428/198 |
| 4,774,907 A | 10/1988 | Yananton | |
| 4,800,677 A | 1/1989 | Mack | |
| 4,822,669 A * | 4/1989 | Roga | 442/373 |
| 4,861,632 A | 8/1989 | Caggiano | |
| 4,913,954 A | 4/1990 | Mack | |
| 4,963,431 A | 10/1990 | Goldstein et al. | |
| 5,152,250 A | 10/1992 | Loeb | |
| 5,173,346 A | 12/1992 | Middleton | |
| 5,216,980 A | 6/1993 | Kiebke | |
| 5,227,214 A * | 7/1993 | Kerr et al. | 428/95 |
| 5,338,340 A | 8/1994 | Kasmark, Jr. et al. | |
| 5,431,643 A | 7/1995 | Ouellette et al. | |
| 5,525,397 A | 6/1996 | Shizuno et al. | |
| 5,736,473 A | 4/1998 | Cohen et al. | |
| 5,819,688 A | 10/1998 | Walker | |

(Continued)

FOREIGN PATENT DOCUMENTS

WO    WO 01/48303    7/2001

OTHER PUBLICATIONS

U.S. Appl. No. 10/033,862, Yananton.

*Primary Examiner* — T. Nguyen
(74) *Attorney, Agent, or Firm* — John D. Gugliotta, PE, Esq

(57) ABSTRACT

A two-layer bonded highloft nonwoven particle entrapment pad, for entrapping soils tracked by pets, comprises an open, porous, bonded highloft nonwoven top layer and an otherwise solid, impenetrable bottom layer or structure secured to its underside. The highloft top layer is manufactured from a synthetic material consisting of numerous matrices or cross-over connections which create open porous sieve-like varieties, wherein a web structure of the highloft layer comprises a distinct top, middle, and bottom that is capable of allowing the particles and the litter to enter and be entrapped therein via gravity when stepped upon. A sticky, tackified adhesive maintained on a complex of bonded fibers of the highloft, said adhesive increases its holding capacity as does mechanical abrasion to the top surface of the highloft nonwoven. The present bonded, highloft pad can be manufactured from a variety of densities, deniers and depths from an airlaid, a drylaid, or a wetlaid process.

11 Claims, 1 Drawing Sheet

U.S. PATENT DOCUMENTS

| | | | |
|---|---|---|---|
| 5,834,104 A | 11/1998 | Cordani | |
| 5,846,603 A | 12/1998 | Miller | |
| 5,961,763 A | 10/1999 | Makouie et al. | |
| 6,039,004 A | 3/2000 | Goss et al. | |
| 6,050,223 A | 4/2000 | Harris | |
| 6,129,978 A | 10/2000 | Caldwell | |
| 6,219,876 B1 | 4/2001 | Blum | |
| 6,386,143 B1 | 5/2002 | Link et al. | |
| 6,453,502 B1 | 9/2002 | Bishop | |
| 6,458,442 B1 | 10/2002 | McKay | |
| 6,532,897 B1 | 3/2003 | Adolfsson | |
| 6,541,099 B1 | 4/2003 | Merker et al. | |
| 6,569,274 B1 | 5/2003 | Makouie et al. | |
| 6,569,494 B1 | 5/2003 | Chambers et al. | |
| 6,589,892 B1 | 7/2003 | Smith et al. | |
| 6,746,974 B1 | 6/2004 | Reiterer et al. | |
| 6,802,924 B2 | 10/2004 | Merker et al. | |
| 6,822,135 B2 | 11/2004 | Soerens et al. | |
| 2002/0160143 A1 | 10/2002 | Shepard et al. | |
| 2003/0003831 A1* | 1/2003 | Childs et al. | 442/340 |
| 2005/0000461 A1* | 1/2005 | Kincaid | 119/169 |
| 2005/0166856 A1* | 8/2005 | Kaneko et al. | 119/169 |
| 2007/0042170 A1* | 2/2007 | Morin | 428/292.1 |
| 2007/0077834 A1* | 4/2007 | Hanson et al. | 442/59 |

* cited by examiner

METHOD AND STRUCTURE FOR ENTRAPPING SOILS CARRIED BY PET'S PAWS, USING A BONDED, POROUS, WEB FORMING, HIGHLOFT NONWOVEN PAD OR RUNNER

RELATED APPLICATIONS

This application makes reference to the following co-pending U.S. Patent Applications and patents. The first application is provisional 60/256,882 filed Dec. 20, 2000 entitled "Absorbent Pad for Retaining Liquids and Eliminating Odors" which was converted to co-pending applications U.S. application Ser. No. 10/033,862, entitled "Absorbent Pad for Entrapping Small and Coarse Particles, Retaining Liquids and Eliminating Odors," filed Dec. 20, 2001 and U.S. application Ser. No. 10/745,147 filed Dec. 23, 2003, "Absorbent Pad for Entrapping Small and Coarse Particles, Retaining Liquids and Eliminating Odors," the subject matter of which is incorporated herein by reference thereto as though recited in full.

BACKGROUND OF THE INVENTION

1. Field of the Invention

The present invention is directed generally to a sturdy class of bonded, porous, web forming highloft nonwovens made of nonabsorbent, synthetic fibers attached to a solid base structure and, more particularly, to disposable pads or runners that entrap, within an inherent matrix of deep bonded fibers, soil, cat litter and other substances brought into or tracked within the home by pets and in which the solid base sheet or structure prevents any of the finer particulates from reaching the floor and also stabilizes the structure, preventing skidding or sliding of the entire pad structure.

2. Description of the Related Art

Tracking of various litter materials has been a problem for home owners since an advent of indoor cat boxes. Many cats track fine litter from the box to the floor via their paws. Not only is litter tracked to nearby floors, it gradually spreads further over large areas throughout the home. Many people also install pet doors that allow their pet to enter and/or to exit the home as desired. The inside floor, adjacent to the pet door, also receives tracked-in soils, mud, grass, leaves and other extraneous materials that cling to pets' paws as they enter.

There are both heavy and expensive plastic mats and artificial turfs commercially available for capturing litter. Artificial turf is avoided by many pets due to its sharp, crisp, stiff feel on their paws. Although these turfs comprise a mechanism to entrap cat litter, they are too expensive to be disposed of and must be emptied on a continuous basis. Rugs are expensive, complex manufactured structures that have a variety of open tufts or fibers, which also only acts as a mat that must be vacuumed, shaken, or beaten to be cleaned, etc. The rug structure comprises open-standing woven tufts made of wovens or nonwovens threaded into a base mat, and is expensive due to the complex manufacturing process involved making the many layers and attachments. Carpets and Rugs have no inner sieve-like variety of open porous pockets that can entrap soils similar to the bonded, highloft nonwoven matrix which is disclosed in this application.

The foregoing older existing flat mats in the marketplace are made from flat plastics or a flat nonwovens such as spunbond, spunlaced or non lofty felts. They require emptying. The flat mats serve as a cover for the floor and nothing more. They have no inner structure that can entrap and immobilize the soils from spreading.

There is, however, discovered a class of bonded, highloft nonwoven synthetic material that is distinct from all other classes of nonwovens. The International Nonwovens Association refers to these bonded highloft nonwovens as web forming structures. Other nonwovens in this class of web forming nonwovens such as carded, garneted, needle punched, melt blown and others are very dense and thick and cannot perform as the bonded highlofts. Felts and many needle punched are also too dense for inner particle entrapment. Unbonded highlofts resemble wadding or are very soft, and consist of fibers layered onto each other, and collapse when weight is added to them. Most synthetic nonwovens in other classes of nonwovens such as spunbond, spunlaced, are very thin, flat or dense; they contain no inner, open, matrix. If these common nonwovens are used to capture soils or cat litter, they'd act as a flat mat simply collecting the litter on a surface in a manner similar to a newspaper or a plastic mat. Dissimilar to these flat, dense nonwovens, the bonded highloft nonwoven synthetic material consists of a resilient, open porous sieve, like a web structure, having a distinct top, middle, and bottom that is capable of allowing soils and cat litter to enter therein; hence, cat litter and soils are entrapped and held within the structure. The litter and soil is prevented from exiting onto the floor by means of a base sheet or a structure attached to the bottom of the highloft web structure. The base aids in carrying the pad and may additionally prevent skidding of the pad when placed on a floor. The base can be made from a variety of films, foams, plastic mat, and other materials such as vinyl that are suitable for this purpose. Also a base structure such as a cardboard or thermo formed plastic box for example can hold the highloft sheet within it, covering the bottom of the highloft nonwoven as well as the sides One can thus manufacture a variety of less expensive, different sized pads or runners (hereinafter collectively referred to as "pads") to act as a disposable soil, debris-collecting device.

The soft but resilient, bonded highloft nonwoven, made from nonabsorbent polyester, nylon, rayon, polypropylene, or other synthetic materials, easily receives these soils by conforming to an underside of the pets' paws, relieving pressure from the paws, and holding the soil or the debris, which is then deposited or pushed by the paw onto the surface of this open porous nonwoven material. Due to the open structure of this bonded highloft, the various soils and cat litters, etc., fall into the middle of the pad before they fall within the inner bonded or the randomly fused, webbed structure or matrix of the highloft pad. They become entrapped and immobilized by and within numerous matrices or cross-over connections of the structure. The middle-to-the-bottom of the pad is a web of many sieve-like varieties of sized spaces. The soil particles become immobilized or entrapped in these spaces, which are essentially created by a crossover and a bonding of its many filaments or fibers. The fibers and crossover junctions are created by adding a binder to the air, dry, or wetlaid process of manufacturing these bonded highlofts. An epoxy resin, or Acrylic binder will create a stiffer stronger bonded pad than a latex binder or vinyl acetate for example, which will be softer. Many of these bonded highlofts are typically used for air or liquid pre filtration. The many pores of this highloft nonwoven are dependent on the free flow of water or air in order to trap larger debris. Certainly adding a solid base layer to this material would negate its ability to perform by stopping the flow of water or air. In contrast, using our discovery we find solids entering this matrix with the aid of the pet stepping on it and gravity acting on the sinking particulates where the finer dust come to rest on the base layer of the pad structure.

If desired, the entire highloft nonwoven structure can be sprayed with any of the permanently sticky, chemically inert, tackified adhesives, or other permanently tacky adhesives, so as to enhance its ability to become Tacky or Sticky and to hold or to entrap the soils or particulates. Many permanent, tacky adhesives are commercially available for this purpose. Many of the permanently tacky adhesives are commercially available for this purpose. Although this spraying of adhesive is desirable in some instances, certain animals may seek to avoid the sticky feeling to its paws; hence, it is conceivable that the base of the pad is alone treated with the tackified adhesive or it is treated in combination with an application of tackified adhesive to the bottom of the highloft nonwoven before it is attached to the bottom impenetrable layer.

Another technique for capturing larger soils and cat litter on the surface of the pad is to physically abrade the surface of the highloft with a mechanical instrument such as a wire brush so as to break some of the linked fibers and create larger pores and openings in the surface. This abrasion also imparts a more brush like appearance and function to the surface that not only helps to capture and entrap larger particulates and soils but also aids in the scraping of the animals paws.

Six 18×24 inch pads, 1 inch high were placed at a 45 degree angle. Three of the pads were abraded with a wire brush by a simple swipe in the width and length direction using minimal pressure. When any of the fine cat litters were spilled onto the slanted pads, all of the fine clumping cat litter sank into the normal as well as abraded pad. However when the old fashioned clay litter consisting of larger flakes of clay down to dust were applied to the pads, only the abraded pads were able to capture the larger particles, or they became immobilized on the surface. The unabraded pads had 90% of the cat litter fall into the pad but the larger clay flakes remained on the surface able to roll down the surface, as the pores in the highloft were too small to entrap the larger flakes. Altering the openings on the surface of the porous highloft nonwoven allows larger soils to be trapped within the pad. If much larger soils or sands were the targets of entrapment one would simply use a highloft have less density and larger pores with perhaps a larger sized fiber for strength (denier) in combination with a strong binder such as an epoxy resin.

The type of density, denier, and binder of the web forming highloft nonwoven can also be a variable chosen so as custom design the pads need for capturing the size of the particulates to be entrapped and immobilized. Hence a specific pad of less density, thicker fibers or denier, and using a strong binder such as epoxy, can be made for gravels on large Pets versus one manufactured for, fine sand and smaller pets.

Unlike complex manufactured open fiber rugs or plastic turf, the present highloft web structure is easily obtained, easily manufactured, inexpensive, and it can be disposed of and easily replaced as it fills up with litter and soil. The present invention is directed generally to a sturdy, porous class of highloft nonwoven structures and, more particularly, to disposable pads or runners that entrap, within an inherent matrix of deep bonded fibers, soil, cat litter and other substances brought into or tracked within the home. In summary, the pad can be used in households in a variety of ways so as to prevent soils from entering the house or from being tracked away from one source or room to another.

A unique method of soil entrapment deals with the pet walking on the unique flat, sturdy, but open, porous surface of the pad. The method for removing and entrapping soils from a pets paw by stepping on this type of specific nonwoven is easily understood. The sturdy, resilient, bonded, highloft nonwoven, when stepped upon, easily receives these soils by conforming to and scraping the underside of the animal's paws. The debris, cat litter or soil is then deposited or pushed by the paw onto the surface of this open porous nonwoven material as the pet walks over it. Next, the same highloft relieves the pressure on the paw carrying the soil created by the animal walking on a very hard surface such as a floor or cement, then transitioning to the more cushioned but resilient highloft nonwoven surface, which then releases the soil from the paws that are carrying the soil or debris. Gravity pulls the soils into the inner aspects of the pad as well, unlike traditional uses of this bonded highloft nonwoven that rely on water or air flow.

The inner or the middle matrix of this class of highloft nonwovens also comprises a highly porous matrix of bonded highloft nonwoven synthetic material. As the particulates are deposited upon the open pores on the top surface of the pad, they fall within the middle, inner bonded or randomly fused, webbed structure or matrix of the highloft pad, as smaller soils continue to the bottom base sheet to prevent tracking any of these soils to other parts of the household.

Various size pads can be manufactured for the varying sized litterboxes as well as runners for varying sized pets that enter and exit a pet door. A German Sheppard would require a larger and longer runner than a cat for example. A large open cat litter box for multiple cats would require a larger 18×28 inches sized pad than a hooded litterbox requiring a 12×16 inch sized pad foe example. The depth of the pad or runner can vary from ½ inch to 2 inches thick depending on the size of soils to be trapped, size, weight of the animal etc.

There is a long felt need in many pet households for an inexpensive pad that efficiently traps and captures stray soils or cat litter particles to prevent them from soiling other areas that can be easily disposed of and replaced rather than emptied or cleaned.

SUMMARY OF THE INVENTION

It is an object of the present invention to teach a product that captures soils from pets' paws, deposits the soils onto a bonded, highloft pad surface via gravity, and permanently captures the soil within an inner, highloft bonded matrix structure. It is an object to teach a product that effectively prevents soils from being tracked away from the pad to other areas of the home. It is an object to teach a pet pad that is very inexpensive to manufacture such that it is easily disposable.

It is envisioned that a pet pad structure includes a solid antiskid bottom layer and a bonded high loft open porous non-woven top layer, which is manufactured by means of an airlaid, a drylaid, or a wetlaid manufacturing process utilizing any of the synthetic fibers as mentioned above. Other substances, such as sticky, tackified adhesives, can be added to the structure, or it can be abraded to enhance particle entrapment by enhancing a cling of the highloft non-woven pad or increasing the size of the pores on the surface layer.

BRIEF DESCRIPTION OF THE DRAWINGS

Advantages and features of the present invention are better understood with reference to the following and more detailed description and claims taken in conjunction with accompanying drawings, in which like elements are identified with like symbols.

DESCRIPTION OF THE PREFERRED EMBODIMENTS

The best mode for carrying out the invention is presented in terms of its preferred embodiment, herein depicted within the Figures.

1. Detailed Description of the Figures

Figure 1A:
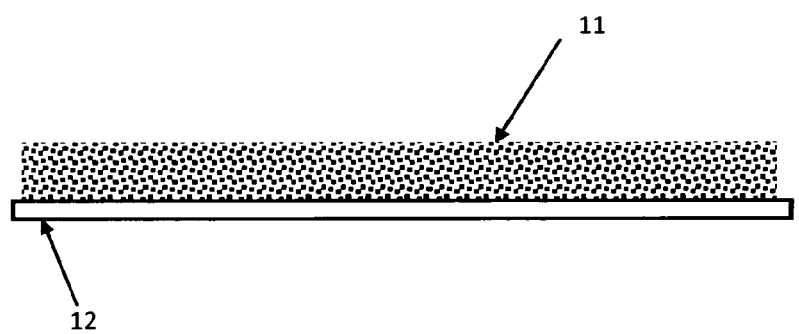
FIG. 1A is a side view of a two-layer bonded highloft nonwoven pad according to the present invention; and, FIG. 1B is a side view of the pad adjacent to a litter box.
Figure 1B:
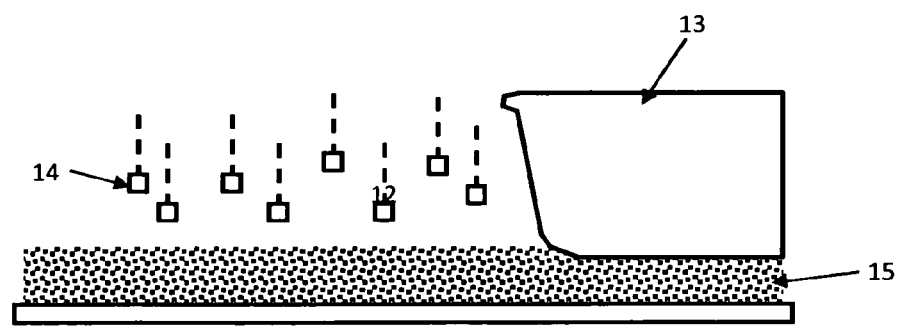

A side view is shown in FIG. 1A of a two-layer bonded highloft nonwoven web mat (herein synonymous to and in combination to a "runner particle-entrapping pad" or a "particle entrapping pad") designed for entrapping soils tracked by pets. The instant invention is cat litter, soil, debris, particle (hereinafter collectively referred to as "particle")-entrapping, pad for use in homes housing mobile pets, such as cats and dogs. The pad includes at least a porous, bonded highloft top layer, which captures and entraps these particles, and a bottom layer that prevents these soils from falling through. FIG. 1A shows one embodiment of a two layer particle entrapping pad 10. The pad 10 entraps particles, typically tracked by pets' paws, within an open, porous, bonded highloft non-woven structure. A high loft non-woven upper layer 11 is secured to a plastic or an otherwise solid, non-penetratable bottom layer 12. The upper highloft nonwoven layer 11 traps fine particles 14. Once the particles 14 are trapped within the non-woven, they either fall to the bottom of the pad 12 or they remain suspended within the highloft nonwoven layer 11. FIG. 1B shows a two layer particle-entrapping pad for use under and adjacent to a cat litter box. A high loft non-woven top layer 11 is secured to a plastic impenetrable bottom layer 12. Particles 14 are trapped in the non-woven layer 11. The bonded highloft nonwoven synthetic material consists of numerous matrices or cross-over connections and open porous sieve-like varieties, wherein the web structure has a distinct top, middle, and bottom that is capable of allowing soils and cat litter to enter therein; hence, cat litter and soils are entrapped and held within the structure. The soil particles become immobilized or entrapped in these spaces, which are essentially created by a crossover and a bonding of its many filaments or fibers. The litter and soil is prevented from exiting onto the floor by means of the bottom layer, i.e., the backing or base sheet 12, or a structure attached to the bottom of the highloft web structure 11. The backing 12 may additionally prevent skidding of the pad when placed on a floor. Adhesive strips, or an similarly achieving anti-skid material, can be added to bottom layer 12 so as to make adherence to another surface or container more secure.

In the embodiments of either FIG. 1A or 1B, additives, such as a sticky, tackified adhesive, can increase a holding capacity of the upper layer 11. The adhesive may provide additional cling, and it can be maintained on the complex of bonded fibers within the web. The upper layer 11 can be manufactured from a variety of densities of high loft non-wovens. This upper porous highloft layer 11 is used to entrap particles and, therefore, the density of the non-woven used depends on the kind of particles the user wants to entrap. Solid bottom layer 12 is made of plastic sheeting, s.a., e.g., a polyethylene or a polypropylene, a rubber, a polymer, a foam latex, or any other substance that forms a barrier against the fine soils and debris falling there through to the floor. This bottom layer 11 prevents dust or line solids from passing through; it protects floor surfaces below it, and it acts as a supporting device.

The synthetic nonwovens used in making this pad are manufactured from an airlaid, a drylaid, or a wetlaid process. The bonded highloft nonwoven structure can be manufactured from any of the usual nylon, polyester, rayon, polyethylene, polypropylene, etc., synthetics. Various densities of the bonded highloft nonwoven can be evaluated and selected to optimize the entrapping aspect of the pad according to a size of the particulates one wishes to accommodate.

Starting from a very high loft, heavy density to a low density, the following examples of materials from Ahlstom:

|  | Weights oz/sg. ft. | Thickness/height - inches |
|---|---|---|
| 545 AD | 3.1. | 1.36 |
| 545-67 | 2.4 | 1.36 |
| HDP 1590 BD | 0.90 | 1.625 |
| PB63DA | 0.63 | 0.65 |
| KW 30 | 0.36 | 0.30 |
| HPR 27PR | 0.28 | 0.19 |
| HP 15 DHBA | 0.20 | 0.25 |

It was found during experimentation that an ideal bonded highloft nonwoven was the density of PB 63 BDA, a polyester, either acrylic or epoxy bonded highloft supplied by Ahlstrom. This highloft appeared to have the widest use, to be the most resilient, and to best catch soils, cat litter and debris. The densities, bonding agent, and raw material disclosed herein are not limited to this specification; rather, they serve as a working example of one structure that reacted to test procedures in an acceptable manner. The depth of the highloft nonwoven can range from ½ inch to three inches, depending on the use. A ¼ inch to 1 inch highloft pad depth was found to be suitable for the majority of uses. The thickness or denier of the fibers can range from 3-40 denier.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

Having thus described the invention what is claimed as new and desired to be secured by Letters Patent is as follows:

1. A method for entrapping soils tracked by pets, comprises:
   a. providing a bonded highloft nonwoven particle entrapment pad of an open, porous, bonded, highloft non-woven top layer;
   b. attaching an impenetrable bottom layer secured to an underside of said highloft layer;
   c. placing say particle entrapment pad on a flat surface, wherein said highloft layer traps soil, litter, particles and debris, which either fall to a bottom of said pad or remain suspended within said highloft layer.

2. The method of claim 1, wherein said bottom layer of said particle entrapment pad is a plastic sheeting selected from a group comprising: a polyethylene; a polypropylene; a rubber; a polymer; a foam latex, vinyl, cardboard box, thermoformed plastic and, any other substance that forms a barrier against particles falling there through said pad to a floor.

3. The method of claim 1, wherein said highloft nonwoven layer is manufactured from a synthetic fiber material consisting of numerous bonded matrices or cross-over connections which create an open porous web, wherein said web structure of said highloft layer comprises a distinct top, middle, and bottom that is capable of allowing the particles and the litter to enter and be entrapped therein.

4. The method of claim 1, further comprising attaching a means to prevent skidding of said pad when it is placed on a floor, said means comprises adhesive strips on said bottom layer.

5. The method of claim 1, wherein said particle entrapment pad further comprising a sticky, tackified adhesive maintained on a complex of bonded fibers of said highloft, said adhesive increases a holding capacity of said highloft layer.

6. The method of claim 1, wherein said particle entrapment pad further comprising a top layer that has been abraded by mechanical means so as to open up and widen the surface pores of the highloft nonwoven, allowing larger particulates to enter, and to help clean the animals paws.

7. The method of claim 1, wherein a density of said highloft layer is selected depending on a size and a shape of particles sought entrapment.

8. The method of claim 1, wherein said highloft layer is manufactured from an airlaid, a drylaid, or a wetlaid process.

9. The method of claim 7, wherein said highloft layer is manufactured from a synthetic selected from a group comprising: nylon; polyester; rayon; polyethylene; and, polypropylene.

10. The method of claim 1, wherein said high loft layer comprises a density of 0.63 oz./sq. ft.

11. The method of particle entrapment whereby an animal steps upon the pad of claim 1.

\* \* \* \* \*